United States Patent [19]

Claxton

[11] Patent Number: 5,557,988
[45] Date of Patent: Sep. 24, 1996

[54] CENTRIPETALLY IMPELLED VEHICLE

[76] Inventor: John C. Claxton, 7852 Feather Oaks Dr., Jacksonville, Fla. 32277

[21] Appl. No.: 346,136

[22] Filed: Nov. 29, 1994

[51] Int. Cl.$^6$ .................................................... B64G 1/24
[52] U.S. Cl. ........................... 74/845; 74/84 R; 244/164; 244/176
[58] Field of Search .................................. 74/84 R, 84 S; 244/158 R, 164, 176, 17.19; 180/7.1

[56] References Cited

U.S. PATENT DOCUMENTS

| 3,555,915 | 1/1971 | Young | 74/84 S |
| 3,968,700 | 7/1976 | Cuff | 74/84 S |
| 5,054,331 | 10/1991 | Rodgers | 74/84 R |
| 5,090,260 | 2/1992 | Delroy | 74/84 S X |

Primary Examiner—Rodney H. Bonck
Assistant Examiner—Troy Grabow
Attorney, Agent, or Firm—Brinks Hofer Gilson & Lione

[57] ABSTRACT

A centripetal impeller to impart a force and having an attachment piece defining an axis of revolution. The impeller has a movable arm pivotable relative to the attachment piece so that the movable arm is a distance r from the axis of revolution. The impeller includes a rotation device coupled to the attachment piece causing the attachment piece to rotate along the axis of revolution. A variable force device is attached to the movable arm to produce a force on the movable arm toward the axis of revolution so as to cause a net force along the axis of revolution.

44 Claims, 2 Drawing Sheets

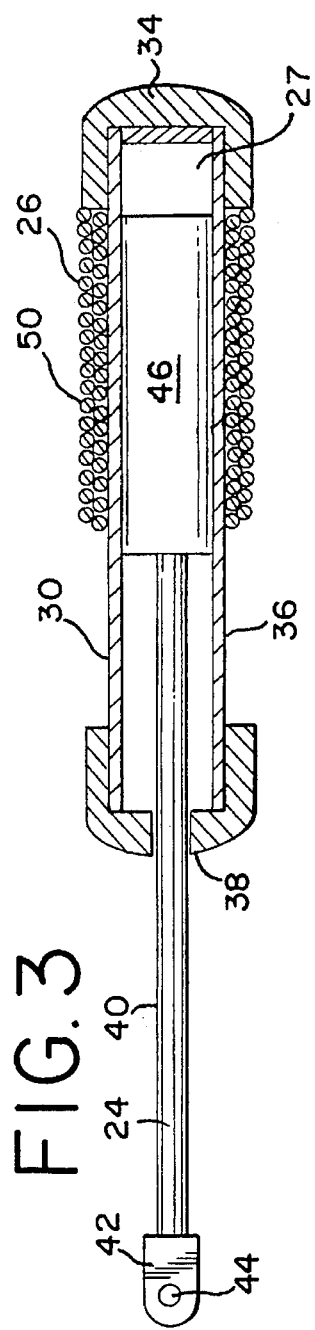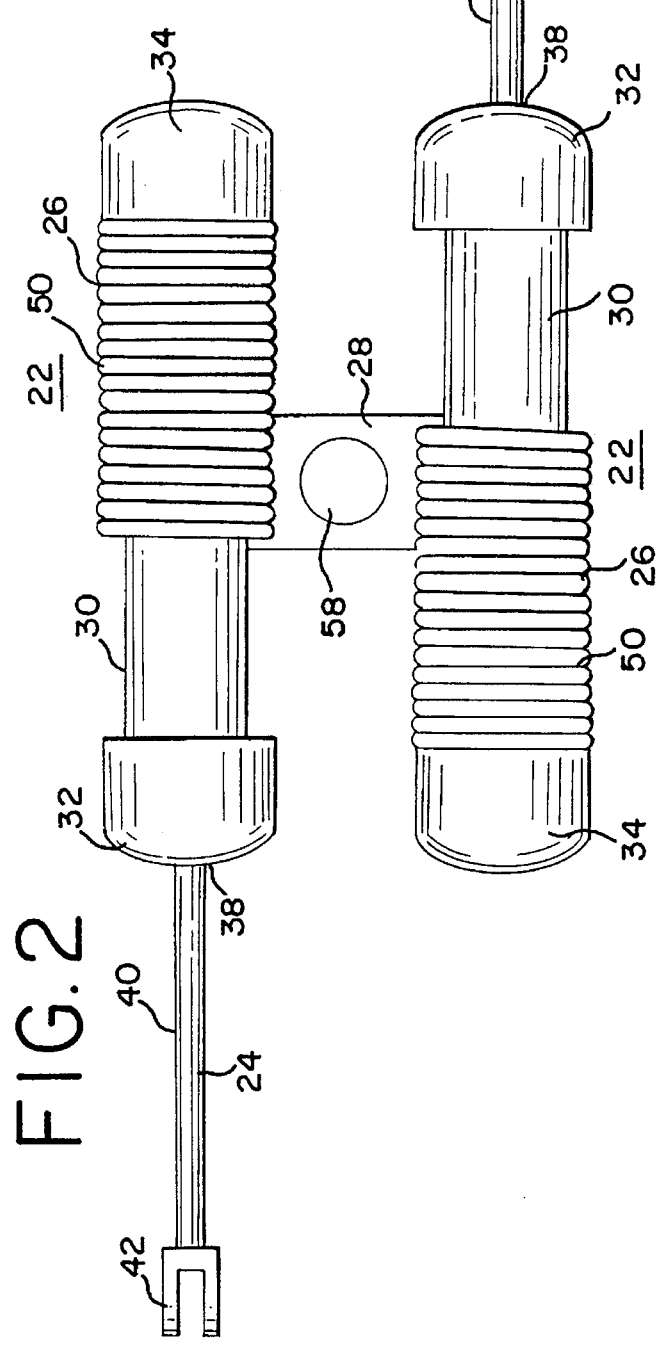

5,557,988

CENTRIPETALLY IMPELLED VEHICLE

BACKGROUND OF THE INVENTION

1. Field of the Invention

The present invention relates generally to propulsion systems for zero gravity or microgravity vehicles or platforms such as rockets, mass drivers, ion emission engines or other such devices. In particular, the present invention concerns a centripetally impelled vehicle that uses rotational motion to produce a net acceleration along a straight line.

2. Discussion of the Prior Art

In the past, vehicles traveling in zero gravity or microgravity, such as spacecraft, have generated acceleration by expelling mass from the vehicle. One common way of expelling mass is to carry rockets or engines that burn fuel carried on the vehicle.

A disadvantage of expelling mass to propel a vehicle is that the amount of time that the vehicle can propel itself is limited by the amount of mass carried on board by the vehicle.

Accordingly, it is an object of the present invention to provide a propulsion system for a vehicle in a zero gravity or microgravity environment, where the mass of the vehicle is conserved while the vehicle is accelerated.

SUMMARY OF THE INVENTION

The present invention concerns a centripetal impeller to impart a force having an attachment piece defining an axis of revolution. The impeller has a movable arm pivotable relative to the attachment piece so that the movable arm is a distance r from the axis of revolution. The impeller includes a rotation device coupled to the attachment piece causing the attachment piece to rotate along the axis of revolution. A variable force device is attached to the movable arm to produce a force on the movable arm toward the axis of revolution so as to cause a net force along the axis of revolution.

Another aspect of the present invention is a centripetally impelled vehicle in which a centripetal impeller is attached to a housing so as to impart a force on the housing that causes the housing and centripetal impeller to move. The centripetal impeller has an attachment piece defining an axis of revolution. The impeller has a movable arm pivotable relative to the attachment piece so that the movable arm is a distance r from the axis of revolution. The impeller includes a rotation device coupled to the attachment piece causing the attachment piece to rotate along the axis of revolution. A variable force device is attached to the movable arm to produce a force on the movable arm toward the axis of revolution so as to cause a net force along the attachment piece and causing the housing to move.

A further aspect of the present invention regards a method of centripetally impelling a vehicle. The method includes the step of rotating a predetermined mass around an axis of revolution to produce a centripetal force directed toward the axis of revolution. An impelling force is generated at a point on the axis of revolution and angled from the axis of revolution, wherein the impelling force is generated in response to the centripetal force. The impelling force is applied to a vehicle so as to move the vehicle along the axis of revolution.

The present invention provides improved duration for vehicles maneuvering in zero gravity and microgravity environments.

A related advantage of the present invention is that it uses a self-contained propulsion system whose energy source is not limited by the amount of mass carried on board by the vehicle.

The foregoing features and advantages of the present invention will be further understood upon consideration of the following detailed description of the invention taken in conjunction with the accompanying drawings, in which:

BRIEF DESCRIPTION OF THE DRAWINGS

FIG. 2 is an enlarged top view of a pair of solenoids used in the centripetal impeller of FIG. 1; and FIG. 3 is a cross-sectional view of one of the solenoids shown in FIG. 2,

DESCRIPTION OF THE PREFERRED EMBODIMENT

Figure 1:
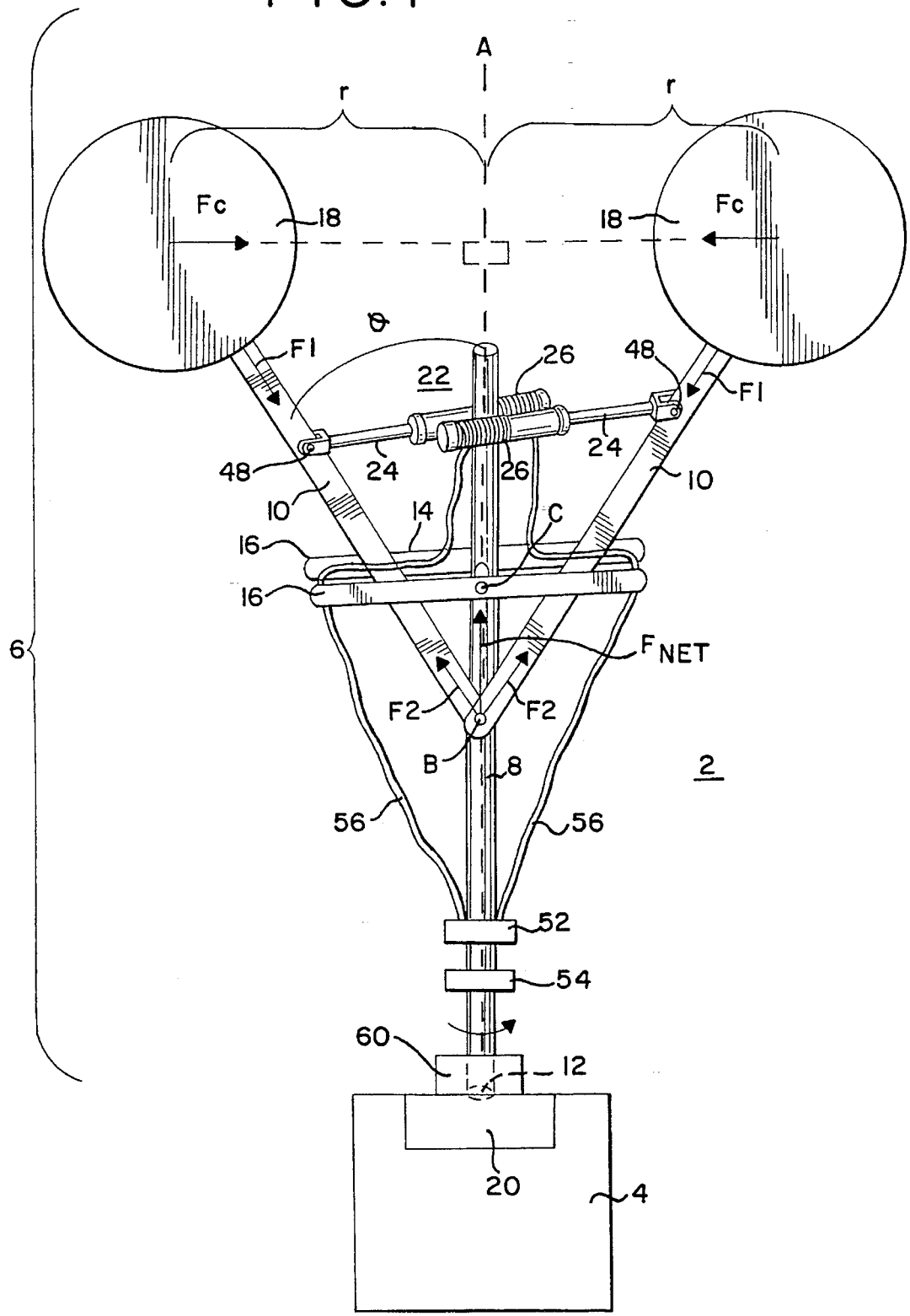
FIG. 1 is a side view of a design embodiment of a centripetal impeller according to the present invention.

The centripetally impelled vehicle of the present invention is best understood by a review of FIGS. 1–3. An embodiment of a centripetally impelled platform or vehicle 2 is shown in FIG. 1. Vehicle 2 has a housing 4 which may accommodate one or more persons. Housing 4 preferably is structured to be used in zero gravity or microgravity environments. Housing 4 can also be constructed to be used in weight suspended media, such as underwater.

Housing 4 is propelled by a centripetal impeller 6 that imparts a force on housing 4 which causes both housing 4 and centripetal impeller 6 to accelerate along a straight line. Centripetal impeller 6 is joined to housing 4 via an attachment piece that rotates about an axis of revolution A, shown by dashed lines. The attachment piece preferably is a cylindrical cold rolled steel rod 8 that is approximately or about 55 cm long and has a diameter of approximately or about 0.79 cm. It is understood that other shapes for rod 8 are possible, such as rectangular rods, without departing from the spirit of the invention. Rod 8 is spun by a conventional rotation device 20, such as being inserted into the plug of a standard drill motor or attached by sleeve to any motor shaft. Rotational device 20 may be powered by various energy sources, such as electricity which can be generated by solar panels, batteries, generators, nuclear power plant, etc, located on the outside (solar panels) or inside the housing 4.

A pair of movable arms 10 are attached to rod 8 approximately 21 cm from the vehicle end 12 of rod 8. Each arm 10 preferably is substantially a cylindrical cold rolled steel rod having a length of approximately 65 cm and a diameter of approximately 3/16". A flattened end of each arm 10 is attached to rod 8 at pivot point B by well known devices, such as a rivet, so that each arm 10 is pivotable relative to rod 8. Pivot point B is located approximately 21 cm from the vehicle end 12 of rod 8.

Each arm 10 is able to pivot about an axis through point B that is perpendicular to axis of revolution A. In addition, each arm 10 pivots so that it forms an angle θ relative to the axis of revolution A which ranges in value from about 30° to about 55°. The maximum amount of angular movement is determined by an alignment guide 14. Alignment guide 14 preferably comprises a channel or slot formed by a pair of brackets 16 that are spaced from each other by approximately 5/16 so that each arm 10 fits within the channel formed therebetween. Each bracket 16 preferably has a length of approximately 12" and is attached at point C located approximately 31 cm from the vehicle end 12 of rod 8. Attachment at point C is accomplished by such well known techniques, such as welding. Furthermore, the ends of brackets 16 are joined together by well known devices, such as rivet pins welded at the ends, so that they form a barrier at each end to prevent both arms 10 from pivoting past the barrier.

Each arm 10 includes a predetermined mass attached thereto that preferably is a steel spherical ball 18 having a mass of approximately 0.9 kg and a diameter of approximately 6 cm. In order to counterbalance each other, the balls have equal mass and are located at the same position and angle θ relative to pivot B and axis A, respectively. The ball 18 preferably is threaded onto or welded to arm 10 in a well known manner. Once attached, the center of mass of ball 18 is a distance r from the axis of revolution A, as seen in FIG. 1. It is understood that other shapes and masses are possible for the predetermined mass without departing from the spirit of the invention.

In order to generate a centripetal force, rod 8 is rotated about the axis of revolution A by an amount ranging from 1 revolution per minute (rpm) to approximately 25 rpm. A rotation device 20, such as a standard drill motor or motor shaft, is coupled to rod 8 to cause the rotation. As seen in FIG. 1, rotation of rod 8 causes arms 10 and balls 18 to spin around axis of revolution A. In order to counteract any rotational motion imparted on housing 4, counter-rotational devices that are well known in the art can be employed on the housing 4. For example, it is envisioned to place a counter-rotational device on the opposite side of housing 4 than that of impeller 6. The counter-rotational device will then be spun in a direction opposite to that of balls 18 so as to counteract the rotational effects of impeller 6.

Not wishing to be bound by any theory of operation, it is believed that the present invention operates by having the spinning motion generate a centripetal force $F_c$ that is directed toward the axis of revolution. The centripetal force is the result in part of a force, $F_1$, generated at one end of rod 8. Force $F_1$ is counteracted in rod 8 by a second force, $F_2$, that acts on pivot point B. Accordingly, the net force, $F_{Net}$, acting along rod 8 at pivot point B is equal to $F_{Net}=2 F_2 \cos θ$. The net force is transmitted via rod 8 to housing 2 so as to cause the housing and impeller to move.

The net force along rod 8 can be increased by increasing the centripetal force imparted on arms 10 toward the axis of revolution A. As seen in FIG. 2, this increase in force is accomplished by a pair of variable force devices 22 that each comprise a movable rod 24 and a movement device, such as solenoid 26. Each arm 10 is indirectly attached to solenoid 26 via a movable rod 24 that is pivotally attached to arm 10 and is received within an interior 27 of solenoid 26.

It is also understood that the net force along rod 8 can be increased by using more than two arms 10 and balls 18 which spin around rod 8.

As seen in FIG. 3, the structure of each variable force device 22 includes a half-tube 30 made of a non-magnetic material, such as heat resistant polychloroethene (CPVC). Half-tube 30 preferably is cylindrical in shape with one closed end and having: a length of approximately 12 cm and a diameter of approximately ½". Attached to each end of half-tube 30 are end pieces or caps 32, 34. The end pieces 32, 34 may be attached to half-tube 30 by such well know ways as sliding half-tube 30 into caps 32, 34 to form a compression fit or providing threads on both end pieces 32, 34 and half-tube 30 so that caps 32, 34 can be screwed onto the exterior surface 36 of half-tube 30. Once attached, the combination of half tube 30 and the two end pieces 32, 34 preferably span a length of approximately 14 cm. Note that cap 32 has a hole 38 to allow a portion of movable rod 24 to pass therethrough as seen in FIGS. 2–3.

Movable, rod 24 preferably has two parts-an attachment rod 40 with a connector 42 at one end which may have a hole 44 and a magnetic core 46 attached to attachment rod 40. Attachment rod 40 preferably is cylindrical in shape having a length of approximately 12 cm and a diameter of approximately 0.3 cm. In the embodiment shown in FIGS. 2 and 3, one end of rod 40 is fork-shaped to receive arm 10 therein. Rod 40 includes holes 44 to receive a rivet that is inserted into a corresponding hole of arm 10. In another embodiment, the end of rod 40 is flattened to form connector 42 in the shape of a square end having a length of approximately 0.7 cm and hole 44 formed therethrough. Magnetic core 46 is preferably made of iron and is cylindrical in shape having a length of approximately 7 cm and a diameter of approximately ⅜". Movable rod 24 is attached to arm 10 at pivot points 48 by such well known devices as rivets. Pivot point 48 is located approximately 25–30 cm from point B. Movable rod 24 pushes or pulls on arm 10 away from or toward, respectively, the axis of revolution A. In particular, during the: pushing and pulling of rod 24, rod 24 preferably moves in a direction perpendicular to the axis of revolution A.

Movement of rod 24 is accomplished by forming a solenoid 26 at one end of half-tube 30, preferably the end nearest cap 34. A wire 50 is wrapped or coiled about the exterior surface of solenoid 26. As seen in FIG. 3, coiled wire 50 covers approximately 6 cm or one half of half-tube 30. Preferably, two sets of wires are connected in series and wound around half-tube 30. The wire preferably is made of 22 AWG enamel coated magnet wire having a total length of each wire is approximately 100 feet. This results in each wire being wrapped around its respective half-tube 30 approximately 500 times. A D.C. peak voltage ranging from approximately 0–12 V is applied to the wire 50 causing a current ranging from 0–120 Amperes being supplied to coiled wire 50 by conventional device, such as rings 52 and brushes 54 and wires 56. Other conventional devices for supplying electricity to solenoid 26 include solar panels, batteries, generators, nuclear power plant, etc.

It is well known that solenoid 26 produces a magnetic field along its axis in a direction depending on the direction of the current flowing through the coiled wire 50. The strength of the magnetic field produced within solenoid 26 can be varied by changing the amount of current flowing through coiled wire 50. By producing a current flowing in one sense through coiled wire 50, the magnetic field attracts the magnetic core into the interior of the solenoid, as seen in FIG. 2. On the other hand, magnetic core 46 and rod 24 are repelled out of solenoid 26 when the sense of the current is reversed so that only a part magnetic core 46 lies within solenoid 26.

As seen in FIG. 2, two solenoids 26 are mounted on a movable bracket 28. Bracket 28 preferably is a 1 cubic inch cube of heat resistant nylon or CPVC which is glued or otherwise attached to the bottom sides of the pair of solenoids 26. Bracket 28 has a hole 58 having a diameter of approximately 0.81 cm to slidingly receive rod 8 therethrough. Once mounted on bracket 28, solenoids 26 freely slide with a bracket 28 along rod 8 so that the axes of the solenoids 26 are constantly aligned perpendicular to the axis of revolution A.

The above-described centripetally impelled vehicle is driven by repeating a cycle of motions. At the beginning of the cycle, balls 18 are positioned nearest rod 8 as well as to one another. Rod 8 is rotated about axis of revolution A. As the spin of rod 8 increases, arms 10 and balls 18 begin to spread producing a centripetal force directed toward the axis of revolution A. In response to the centripetal force, an impelling force is generated at pivot point B on the axis of revolution A where the impelling force is directed at angle from the axis of revolution A. The impelling force is then applied to the vehicle 4 to move the vehicle along the axis of revolution A.

In order to increase the centripetal force and, thus, the impelling force electricity is made to flow through coiled wire 50 in such a way to pull magnetic core 46 into the interior of solenoid 26. This causes the centripetal force on arm 8, via rod 24, to increase and results in varying the net force along the axis of revolution A. In addition, solenoids 26 slide with movable bracket 28 along rod 8 while the arms 10 are expanded.

While the magnetic force pulls magnetic core 46 inward, the rotation of balls 18 is increased as well resulting in increased centripetal force being generated than if the balls 18 were rotating freely. Accordingly, the impelling force and net force applied at point B and on the vehicle 2 is increased. After balls 18 reach their furthest outward point, the current in coiled wire 50 is reduced, and the spin of rod 8 is reduced. When the spin has been sufficiently reduced, the current running through coiled wire 50 is increased to draw balls 18 back to their original position near the axis of revolution A. At that original position, the above-described cycle is repeated. The above-described operating cycle does much more work in pulling the vehicle 2 forward on spreading of the arms than it does in returning the arms to closed position.

It is understood that several variations of the centripetal impeller described above are possible. For example, in one variation the centripetal impeller may work as a reverse thruster by pivoting balls 18 past pivot point B so that the balls 18 point toward the housing 4. In this position, the above-mentioned operation cycle for forward propulsion is repeated resulting in a net force along axis of revolution A and directed toward the housing 4 resulting in the vehicle 2 to move in a backward direction.

In another variation that does not depart from the spirit of the present invention, it is possible to interpose a controllable steering mechanism, such as gimbel device 60, between rotation device 20 and rod 8. Once rod 8 is inserted into gimbel device 60 it is possible in a well known manner to control or adjust the direction at which rod 8 and the axis of revolution A point. Accordingly, the vehicle is able to maneuver in various directions.

Another variation of the present invention is to size housing 4 to hold as few as one person. Furthermore, the impeller can be attached to non-manned vehicles, such as satellites, space platforms, deep water exploration vehicles and projectiles to allow for economical and efficient movement in outer space or an underwater environment.

It is also understood that the present invention is not limited to the scale of the centripetally impelled vehicle described above. In fact, by increasing the scale of the impeller, including the mass of balls 18, and increasing the rotational spin a larger net force can be generated by the impeller. Accordingly, it is envisioned that the present invention can be scaled up to sizes that would make it feasible for a vehicle to travel large distances in outer space in a reasonable amount of time.

The foregoing description is provided to illustrate the invention, and is not to be construed as a limitation. Numerous additions, substitutions and other changes can be made to the invention without departing from its scope as set forth in the appended claims. For example, it is understood that using the more than two rotating masses can be used to generate the centripetal force is possible. Accordingly, the scope of the invention should be determined by the appended claims and their legal equivalents.

I claim:

1. A centripetally impelled vehicle, comprising:
   a housing;
   a centripetal impeller attached to said housing so as to impart a force on said housing that causes said housing and centripetal impeller to move, said centripetal impeller comprising:
   an attachment piece attached to said housing and defining an axis of revolution;
   a movable arm pivotable relative to said attachment piece so that said movable arm is a distance r from said axis of revolution;
   a rotation device coupled to said attachment piece so as to cause said attachment piece to rotate about said axis of revolution and produce a centripetal force toward said axis of revolution;
   a variable force device attached to said movable arm and producing a force on said movable arm toward said axis of revolution so as to cause a net force along said attachment piece and causing said housing to move.

2. The vehicle of claim 1, wherein said movable arm comprises a predetermined mass attached thereto.

3. The vehicle of claim 2, wherein said predetermined mass is attached to a first end of said arm.

4. The vehicle of claim 3, wherein a second end of said arm is pivotally attached to said attachment piece.

5. The vehicle of claim 1, wherein said variable force device comprises a movable rod attached to said movable arm and a movement device that pulls said movable rod and said movable arm toward said axis of revolution.

6. The vehicle of claim 4, wherein said variable force device comprises a movable rod attached to said movable arm and a movement device that pulls said movable rod and said movable arm toward said axis of revolution.

7. The vehicle of claim 5, wherein said movement device pulls said movable rod in a direction perpendicular to said axis of revolution.

8. The vehicle of claim 6, wherein said movement device pulls said movable rod in a direction perpendicular to said axis of revolution.

9. The vehicle of claim 5, wherein said movement device comprises a solenoid having an interior which receives said movable arm.

10. The vehicle of claim 6, wherein said movement device comprises a solenoid having an interior which receives said movable arm.

11. The vehicle of claim 9, wherein said solenoid has an exterior surface about which a wire carrying electrical current is wrapped.

12. The vehicle of claim 10, wherein said solenoid has an exterior surface, about which a wire carrying electrical current is wrapped.

13. The vehicle of claim 9, wherein said solenoid is attached to a bracket which slides along said attachment piece.

14. The vehicle of claim 10, wherein said solenoid is attached to a bracket which slides along said attachment piece.

15. The vehicle of claim 1, said centripetal impeller further comprising a second movable arm pivotable relative to said attachment piece so that said second movable arm is a distance r from said axis of revolution;

a second variable force device attached to said second movable arm and producing a force on said second movable arm toward said axis of revolution so as to cause a net force along said attachment piece and causing said housing to move.

16. The vehicle of claim 15, wherein said second movable arm comprises a predetermined mass attached thereto.

17. The vehicle of claim 16, wherein a second end of said second arm is pivotally attached to said attachment piece.

18. The vehicle of claim 17, wherein said second variable force device comprises a second movable rod attached to said second movable arm and a second movement device that pulls said second movable rod and said second movable arm toward said axis of revolution.

19. The vehicle of claim 18, wherein said second movement device pulls said second movable rod in a direction perpendicular to said axis of revolution.

20. The vehicle of claim 18, wherein said second movement device comprises a second solenoid having an interior which receives said second movable arm.

21. The vehicle of claim 20, wherein said second solenoid has an exterior surface about which a wire carrying electrical current is wrapped.

22. The vehicle of claim 21, wherein said second solenoid is attached to a bracket which slides along said attachment piece.

23. A centripetal impeller to impart a force, said centripetal impeller comprising:

an attachment piece defining an axis of revolution;

a movable arm pivotable relative to said attachment piece so that said movable arm is a distance r from said axis of revolution;

a rotation device coupled to said attachment piece so as to cause said attachment piece to rotate along said axis of revolution and produce a centripetal force toward said axis of revolution;

a variable force device attached to said movable arm and producing a force on said movable arm toward said axis of revolution so as to cause a net force along said axis of revolution.

24. The centripetal impeller of claim 23, wherein said movable arm comprises a predetermined mass attached thereto.

25. The centripetal impeller of claim 24, wherein said predetermined mass is attached to a first end of said arm.

26. The centripetal impeller of claim 25, wherein a second end of said arm is pivotally attached to said attachment piece.

27. The centripetal impeller of claim 26, wherein said variable force device comprises a movable rod attached to said movable arm and a movement device that pulls said movable rod and said movable arm toward said axis of revolution.

28. The centripetal impeller of claim 27, wherein said movement device pulls said movable rod in a direction perpendicular to said axis of revolution.

29. The centripetal impeller of claim 27, wherein said movement device comprises a solenoid having an interior which receives said movable arm.

30. The centripetal impeller of claim 29, wherein said solenoid has an exterior surface about which a wire carrying electrical current is wrapped.

31. The centripetal impeller of claim 30, wherein said solenoid is attached to a bracket which slides along said attachment piece.

32. The centripetal impeller of claim 29 further comprising:

a second movable arm pivotable relative to said attachment piece so that said second movable arm is a distance r from said axis of revolution;

a second variable force device attached to said second movable arm and producing a force on said second movable arm toward said axis of revolution so as to cause a net force along said attachment piece and causing said impeller to move.

33. The centripetal impeller of claim 32, wherein said second movable arm comprises a predetermined mass attached thereto.

34. The centripetal impeller of claim 33, wherein a second end of said second arm is pivotally attached to said attachment piece.

35. The centripetal impeller of claim 32, wherein said second variable force device comprises a second movable rod attached to said second movable arm and a second movement device that pulls said second movable rod and said second movable arm toward said axis of revolution.

36. The centripetal impeller of claim 32, wherein said second movement device pulls said second movable rod in a direction perpendicular to said axis of revolution.

37. The centripetal impeller of claim 35, wherein said second movement device comprises a second solenoid having an interior which receives said second movable arm.

38. The centripetal impeller of claim 37, wherein said second solenoid has an exterior surface about which a wire carrying electrical current is wrapped.

39. The centripetal impeller of claim 37, wherein said second solenoid is attached to a bracket which slides along said attachment piece.

40. The centripetal impeller of claim 1, further comprising a steering mechanism that controls the direction of said axis of revolution.

41. The centripetal impeller of claim 40, wherein said steering mechanism comprises a gimbel device attached to said attachment piece and said rotation device.

42. A method of centripetally impelling a vehicle, said method comprising the steps of:

rotating a predetermined mass around an axis of revolution to produce a centripetal force directed toward said axis of revolution;

generating an impelling force at a point on said axis of revolution and angled from said axis of revolution, wherein said impelling force is generated in response to said centripetal force;

applying said impelling force to a vehicle so as to move said vehicle along said axis of revolution.

43. The method of claim 42, comprising the step of:

applying a variable force toward said axis of revolution so as to cause a net force along said axis of revolution.

44. The method of claim 42, further comprising the step of:

adjusting the direction of said axis of revolution.

\* \* \* \* \*